Sept. 6, 1927.
P. A. SCHMUCK
SWIVEL ROPE SOCKET
Filed July 17, 1926
1,641,696
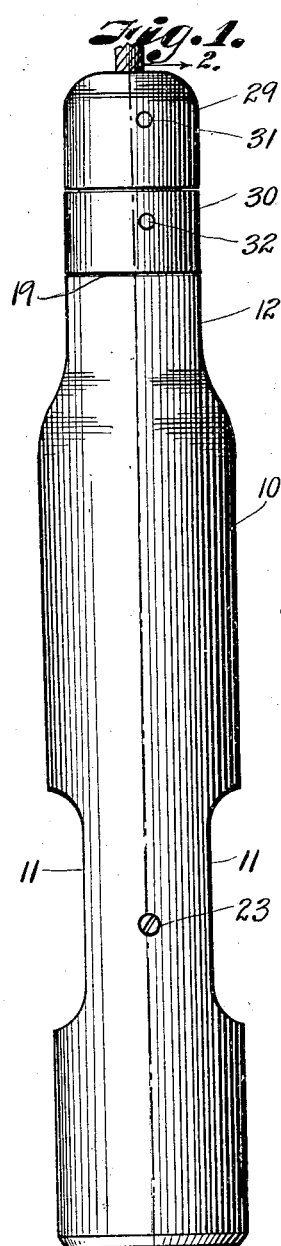
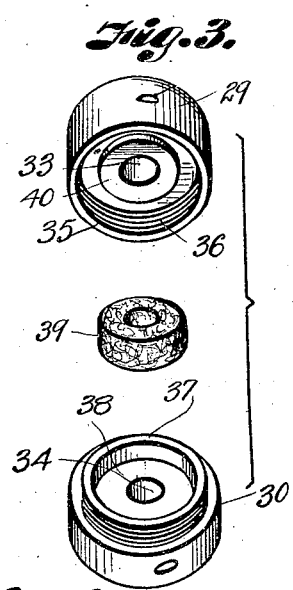
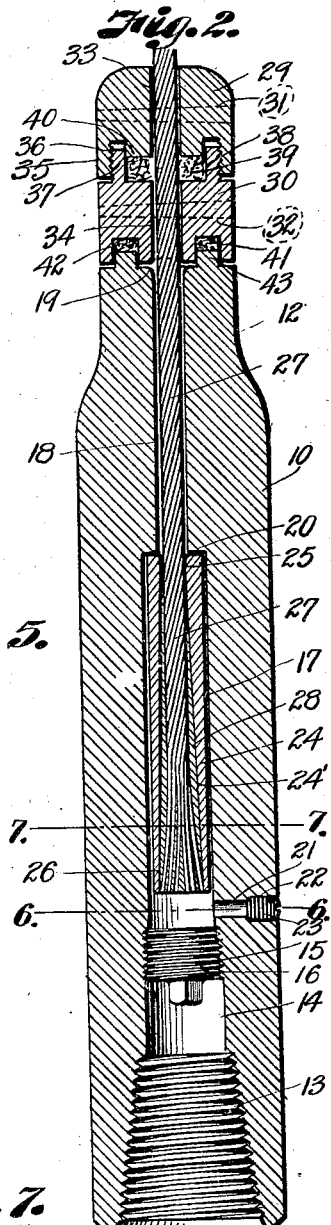
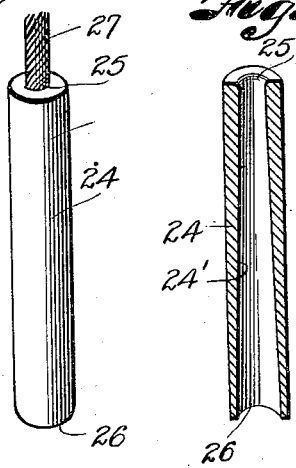
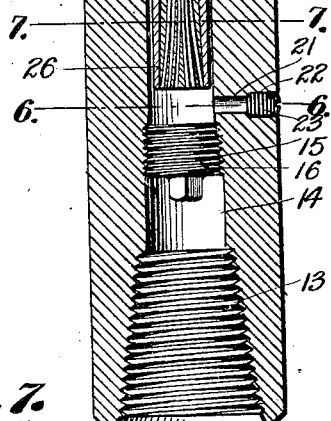
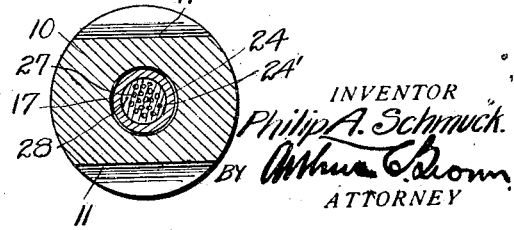
INVENTOR
Philip A. Schmuck
BY Arthur C. Brown
ATTORNEY Patented Sept. 6, 1927.

1,641,696

UNITED STATES PATENT OFFICE.

PHILIP A. SCHMUCK, OF TULSA, OKLAHOMA.

SWIVEL ROPE SOCKET.

Application filed July 17, 1926. Serial No. 123,035.

My invention relates to a swivel and more particularly to a swivel member for mounting on a rope or cable.

It is a purpose of my invention to provide a swivel member that is particularly adapted for use in connection with oil well apparatus and which is provided with an internal swivel member secured to the end portion of the flexible member carrying the swivel and which is rotatable within the body portion of the device.

It is a further purpose of my invention to provide means for lubricating the member secured to the end of the flexible member so that the same will turn readily within the socket or bearing provided for the same in the body member.

It is a further purpose of the invention to provide means externally of the body portion and secured to the flexible member for providing a tight joint between the flexible member and the body portion to thus prevent escape of lubricant from the body portion and entrance of foreign matter into the body portion.

It is a further purpose of the invention to provide means externally of the body portion of the swivel for preventing endwise movement of the internal swivel member within a socket, which is objectionable as it causes enlargement of the swivel member so that it will fit so tightly in its bearing that it will not rotate therein. Said means preferably comprises a pair of relatively movable members, one of which is adjustable relative to the other and both of which are adapted to be independently secured to the flexible member so that by adjustment of said members relative to each other, the inner rotatable member is brought into close engagement with the end of its bearing within the body portion to thus avoid axial movement of the rotatable member within the bearing. Furthermore, by providing the rotatable member within the housing and the means carried by the flexible member exteriorly of the housing and rotatable relative to the housing, the flexible member is held substantially in axial alignment with the passages therefor in the housing, avoiding undue wear of said flexible member by engagement with the walls of the passage.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a side elevational view of my improved swivel.

Fig. 2 is a longitudinal sectional view thereof taken substantially on the line 2—2 of Fig. 1.

Fig. 3 is a perspective view of the external swivel member, showing the parts thereof separated.

Fig. 4 is a perspective view of the internal swivel member.

Fig. 5 is a longitudinal sectional view thereof.

Fig. 6 is a section taken on the line 6—6 of Fig. 2, and

Fig. 7 is a section taken on the line 7—7 of Fig. 2.

Referring in detail to the drawings:

My improved swivel member comprises a body portion 10 which is provided with the flattened faces 11 on opposite sides thereof for engagement of a suitable tool such as a wrench therewith for turning the member 10. Said member 10 is provided with a reduced upper end portion 12 and with an internally threaded tapering opening 13 at the opposite end thereof which is adapted for connection with a threaded pin on a member carried by the swivel, such as a tool or other device that is to be supported by a suitable flexible member in the usual manner. A substantially cylindrical passage 14 leads from the internally threaded portion 13 to the internally threaded portion 15 with which a plug 16 screw-threadedly engages. Leading from the threaded portion 15 toward the interior of the body portion 10 is an elongated cylindrical bearing portion 17 and from said bearing portion a passage 18 of reduced diameter leads to the end portion 19 of the body portion 10, a shoulder being provided at 20 between the passage 18 and the bearing portion 17. A laterally extending lubricant passage 21 leading outwardly from the bearing portion 17 is provided with an internally threaded portion 22 that screw-threadedly engages with the plug 23 which may be removed for inserting lubricant within the bearing portion or chamber 17 by any suitable means for inserting lubricant under pressure.

Mounted for rotation within the bearing chamber 17 is the internal swivel member 24 which has a substantially cylindrical outer wall portion and which is provided with a tapering bore 24' increasing gradually in diameter from the small end 25 thereof to the large end 26 thereof. A flexible member 27 is mounted within the member 24, being held in place therein by means of suitable metal of low fusing point, such as lead, indicated by the numeral 28, which keys the member 27 within the tapering bore 24' to thus firmly secure said flexible member to the rotatable member 24. The flexible member 27 extends through the passage 18 and has the collars 29 and 30 mounted thereon externally of the body portion 10. The members 29 and 30 are held in position respectively on the flexible member 27 by means of the tapering pins 31 and 32 mounted in correspondingly tapering sockets in the members 29 and 30, said pins wedging the flexible member 27 into firm engagement with the wall portions of the longitudinally extending passages 33 and 34 in the members 29 and 30 respectively.

The member 29 is provided with a downwardly extending annular flange portion 35 which is provided with internal screw threads 36 that engage with the externally screw threaded annular flange portion 37 provided on the member 30 and extending upwardly therefrom. The flange portion 37 provides a socket 38 in the upper end of the member 30 within which the compressible gasket 39 is seated, said gasket engaging with the annular rib 40 provided on the member 29 surrounding the opening 33 therein at the lower end thereof. The member 30 is furthermore provided with an annular groove 41 in the lower end thereof which is concentric with the opening 34 and within which is seated a compressible gasket 42. The end portion 19 of the body portion 10 is provided with an annular rib 43 that is concentric with the opening 18 and that is adapted to fit within the groove 41 so that while the members 30 and 29 are rotatable relative to the member 10, the movement thereof will be guided so that the flexible member 27 will be maintained with its axis concentric with the axis of the passage 18. As the passage 18 is slightly larger in diameter than the flexible member 27, the flexible member 27 will not contact with the wall of the passage 18.

In assembling the device the flexible member 27 is first drawn lengthwise through the body portion 10 until the end thereof is exposed beyond the body portion 10 in the lower end thereof which is provided with the internally threaded portion 13. The member 24 is then placed in position on the flexible member 27 and the readily fusible metal 28 is poured around the flexible member in the bore 24' to thus anchor the member 24 to the flexible member 27. After this has been done, the flexible member 27 is drawn up into the body portion 10 until the end thereof engages with the shoulder 20. The plug 16 is then screwed into position by any suitable tool engaging with any suitably shaped projection 44 thereon and after this has been done the members 29 and 30 which have been placed on the member 27 previous to pulling the same through the body portion 10, are brought down into engagement with the body portion 10. The member 29 is then rotated relative to the member 30 to compress the gasket 39 as much as possible, whereupon the pin 31 is driven into place to firmly engage the member 29 with the flexible member 27. After this has been done the member 30 is rotated relative to the member 29 to move the same away from the member 29 or toward the end 19 of the body portion 10. Upon doing this the flexible member 27 is drawn tight so as to take up any play that might exist between the member 24 and the member 10, and after this has been done the pin 32 is driven into position to firmly secure the member 30 to the flexible member 27, thus preventing relative rotation of the members 29 and 30 and holding the same in adjusted position. The plug 23 is then removed and lubricant is injected into the chamber 17 through the passage 21 by any suitable pressure means, after which the plug 23 is replaced and the device is ready for use. The gaskets 39 and 42 will then be compressed so as to provide a tight joint between the member 30 and the body portion 10, and between the member 29 and the flexible member 27. At the same time a swivel bearing is provided within the body portion 10 between the member 23 and the wall portion of the bearing chamber 17 and externally of the member 10 between the annular rib 43 and the groove 41 in the member 30.

What I claim and desire to secure by Letters Patent is:—

1. In a swivel, a body portion having a passage therein, a flexible member extending into said passage, a retaining member therefor rotatable in said body portion, a lubricating passage leading into said first passage, a closure member for one end of said passage and means for providing a tight joint at the other end of said passage comprising means mounted on said flexible member provided with a compressible gasket engaging said body portion adjacent said last mentioned end.

2. In a swivel, a body portion having a passage therein, a flexible member extending into said passage, a retaining member therefor rotatable in said body portion, a lubricating passage leading into said first passage, a closure member for one end of said passage and means for providing a tight joint at the other end of said passage comprising means mounted on said flexible member provided with a compressible gasket engaging said body portion adjacent said last mentioned end and a compressible gasket engaging said flexible member.

3. In a swivel, a body portion having an opening therethrough, said opening comprising a passage for a flexible member and an enlarged portion forming a chamber, a retaining member for a flexible member mounted for rotation in said chamber, a closure for the end of said chamber remote from said passage, a pair of relatively adjustable members secured to said flexible member externally of said body portion, and a gasket between one of said adjustable members and said body portion.

4. In a swivel, a body portion having an opening therethrough, said opening comprising a passage for a flexible member and an enlarged portion forming a chamber, a retaining member for a flexible member mounted for rotation in said chamber, a closure for the end of said chamber remote from said passage, a pair of relatively adjustable members secured to said flexible member externally of said body portion, a gasket between one of said adjustable members and said body portion, and a gasket between said adjustable members engaging said flexible member.

5. In a swivel, a body portion having an opening therethrough, said opening comprising a passage for a flexible member and an enlarged portion forming a chamber, a retaining member for a flexible member mounted for rotation in said chamber, a closure for the end of said chamber remote from said passage, a pair of relatively adjustable members secured to said flexible member externally of said body portion, a gasket between one of said adjustable members and said body portion, and a gasket between said adjustable members engaging said flexible member, said relatively adjustable members each having means for independently securing the same to said flexible member.

6. In a swivel, a body portion having an opening therethrough, said opening comprising a passage for a flexible member and an enlarged portion forming a chamber, a retaining member for a flexible member mounted for rotation in said chamber, a closure for the end of said chamber remote from said passage, a pair of relatively adjustable members secured to said flexible member externally of said body portion, a gasket between one of said adjustable members and said body portion, and a gasket between said adjustable members engaging said flexible member, said relatively adjustable members each having means for independently securing the same to said flexible member and having a threaded connection for moving said adjustable members relative to each other axially of said flexible member.

7. A device of the character described comprising a body portion having a bearing chamber therein and a passage for a flexible member leading from said chamber to one end of said body portion, a flexible member extending through said passage, a sleeve on said flexible member rotatable in said bearing chamber and means externally of said body portion engaging said flexible member for drawing said sleeve into engagement with a shoulder in said body portion.

8. A device of the character described comprising a body portion having a bearing chamber therein and a passage for a flexible member leading from said chamber to one end of said body portion, a flexible member extending through said passage, a sleeve on said flexible member rotatable in said bearing chamber and means externally of said body portion for drawing said sleeve into engagement with a shoulder in said body portion, said means comprising a member engaging said flexible member, a member engaging said body portion and means for moving said members relative to each other lengthwise of said flexible member.

9. A device of the character described comprising a body portion having a bearing chamber therein and a passage for a flexible member leading from said chamber to one end of said body portion, a flexible member extending through said passage, a sleeve on said flexible member rotatable in said bearing chamber and means externally of said body rotatable with the flexible portion cooperating with said sleeve for guiding the rotative movements of said flexible member relative to said body portion.

10. A device of the character described comprising a body portion having a bearing chamber therein and a passage for a flexible member leading from said chamber to one end of said body portion, a flexible member extending through said passage, a sleeve on said flexible member rotatable in said bearing chamber and means externally of said body portion for guiding the rotative movements of said flexible member relative to said body portion, said means comprising members carried by said flexible member which swivel on said body portion.

11. A device of the character described comprising a body portion having a passage for a flexible member therein, a flexible member of smaller diameter than said passage extending therethrough and means for swivelly holding said flexible member out of engagement with the walls of said passage comprising means on said flexible member arranged internally and externally of said body portion.

12. A device of the character described comprising a body portion having a passage for a flexible member therein, a flexible member extending therethrough, means on said flexible member for swivelly engaging said body portion respectively arranged internally and externally thereof.

13. A device of the character described comprising a body portion having a passage for a flexible member therein, a flexible member extending therethrough, means on said flexible member for swivelly engaging said body portion respectively arranged internally and externally thereof one of said mentioned means being adjustable to apply tension on a portion of said flexible member extending between said internal and external means.

In testimony whereof I affix my signature.

PHILIP A. SCHMUCK.